G. M. HOWE.
CLUTCH MECHANISM FOR TYPE WRITER PLATENS.
APPLICATION FILED MAY 28, 1908.
989,605.
Patented Apr. 18, 1911.
3 SHEETS—SHEET 2.
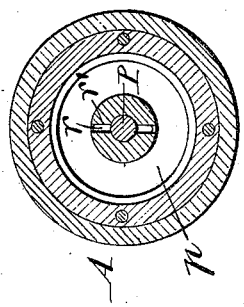
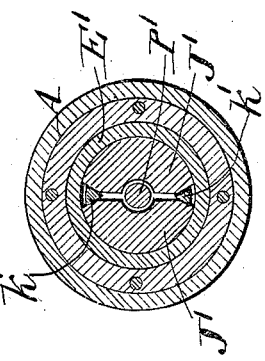
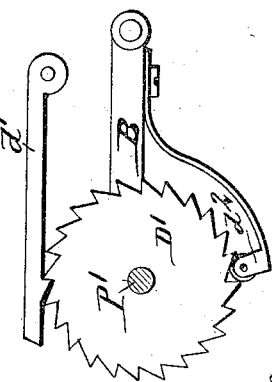
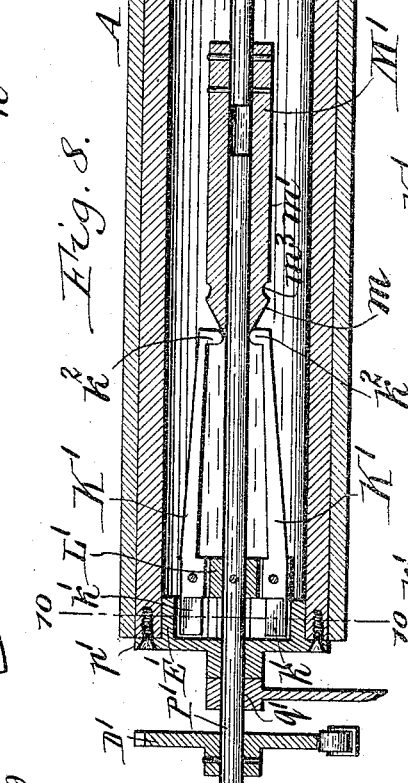
Witnesses:—
Richard Sommer
Gustav W. Hora
Inventor
George M. Howe
by Geyer & Popp
Attorneys G. M. HOWE.
CLUTCH MECHANISM FOR TYPE WRITER PLATENS.
APPLICATION FILED MAY 28, 1908.
989,605.
Patented Apr. 18, 1911.
3 SHEETS—SHEET 3.
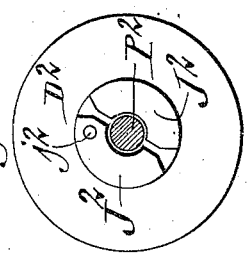
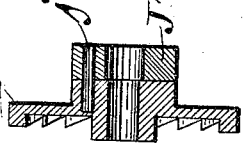
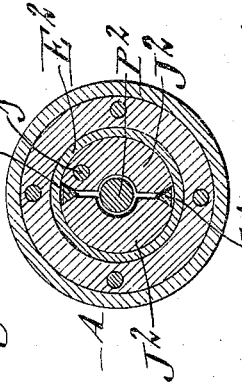
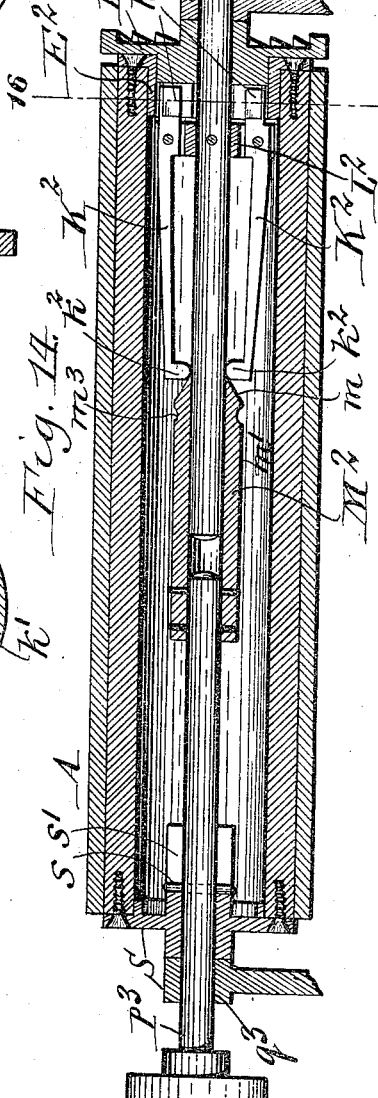
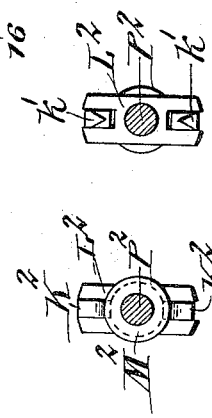
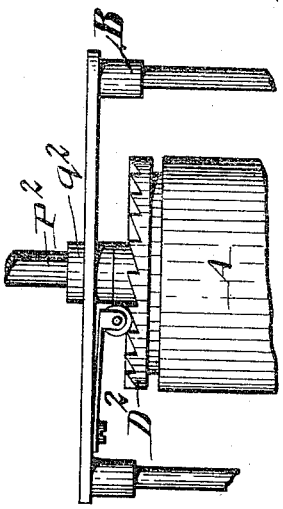
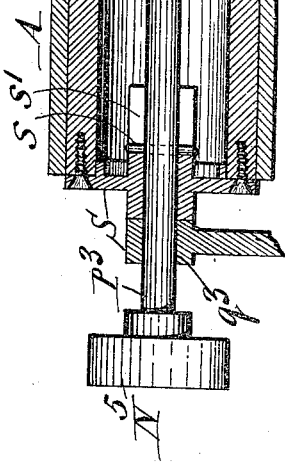
Witnesses:
Richard Sommer
Gustav W. Hora.
Inventor
George M. Howe
by Geyer & Popp
Attorneys

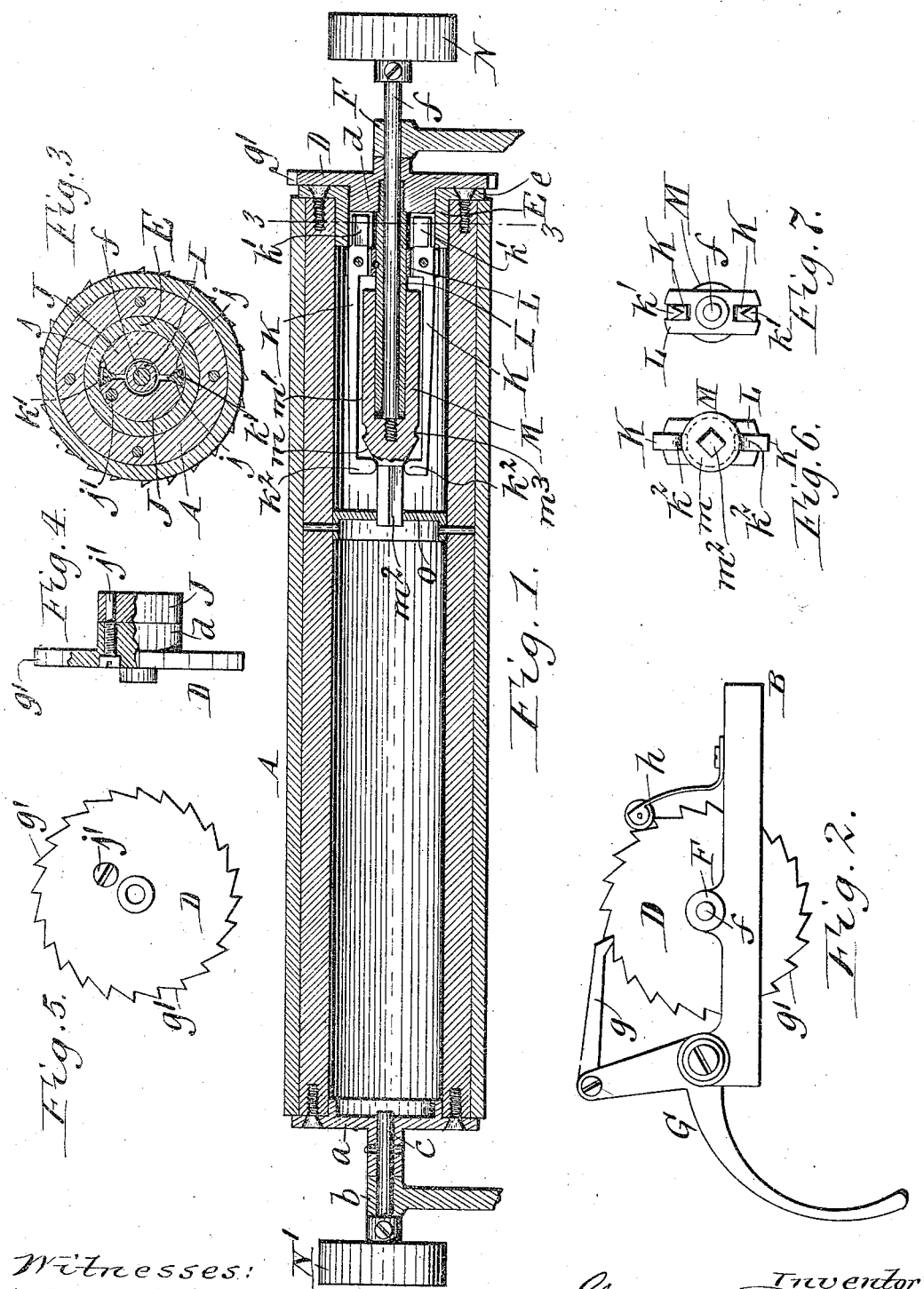

UNITED STATES PATENT OFFICE.

GEORGE M. HOWE, OF BUFFALO, NEW YORK.

CLUTCH MECHANISM FOR TYPE-WRITER PLATENS.

989,605.　　　　　Specification of Letters Patent.　　Patented Apr. 18, 1911.

Application filed May 28, 1908. Serial No. 435,370.

*To all whom it may concern:*

Be it known that I, GEORGE M. HOWE, a citizen of the United States, residing at Buffalo, in the county of Erie and State of New York, have invented a new and useful Improvement in Clutch Mechanism for Type-Writer Platens, of which the following is a specification.

This invention relates to a clutch or coupling for connecting and disconnecting the platen of a typewriting or adding machine and its feeding mechanism, so as to permit of turning the platen independently of the feed mechanism for the purpose of making interlineations or bringing a certain part of the writing surface to the printing position.

The object of this invention is to produce a clutch of this character which will reliably couple and uncouple the platen and its feeding mechanism, which is not liable to become distorted or inoperative during ordinary use, which will remain either in its coupled or uncoupled position without manual aid, and which is so constructed that the operation of uncoupling or coupling the platen and its feed mechanism and the operation of turning the platen when uncoupled from the feed mechanism may be effected by the same hand, thereby leaving the other hand free for manipulating the sheet, the typewriter or other purposes.

In the accompanying drawings consisting of 3 sheets: Figure 1 is a longitudinal section of a typewriter platen and associated parts embodying one form of clutch for containing my invention. Fig. 2 is an end view of the platen supporting carriage and feed mechanism with the right hand shifting button omitted. Fig. 3 is a vertical cross section in line 3—3, Fig. 1. Fig. 4 is a detached edge view, partly in section of the platen feed wheel and one of the clutch jaws. Fig. 5 is a face view of the feed wheel. Fig. 6 is an end view of the clutch operating levers and the shifting sleeve which actuates said levers. Fig. 7 is an end elevation of the clutch levers viewed from the opposite end thereof and showing the support for the same. Fig. 8 is a longitudinal section of a platen provided with a modified form of my improved clutch for connecting and disconnecting the same with its feed mechanism. Figs. 9, 10 and 11 are transverse sections in the correspondingly numbered lines in Fig. 8. Figs. 12 and 13 are detached sectional elevations of the clutch levers and the support and shifting sleeve associated therewith forming part of the clutch, shown in Figs. 8–11. Fig. 14 is a longitudinal section showing another modification in the construction of the clutch embodying my invention for connecting and disconnecting a typewriter platen and its feed mechanism. Fig. 15 is a fragmentary top plan view of the platen, and its supporting carriage. Fig. 16 is a cross section in line 16—16, Fig. 14. Fig. 17 is a detached vertical section of the feed wheel and one of the clutch jaws forming part of the clutch mechanism shown in Figs. 14 and 16. Fig. 18 is a sectional end view of the same. Figs. 19 and 20 are detached sectional elevations of the clutch levers and their supports viewed from opposite ends and forming part of the clutch mechanism shown in Figs. 14 and 16.

Similar letters of reference indicate corresponding parts throughout the several views.

A represents the hollow cylindrical platen of a typewriter and B the carriage on which the platen is rotatably supported. The means shown in Figs. 1 and 2 for thus supporting the platen on the carriage consists of a spindle $c$ secured to the left head $a$ of the platen and journaled in a bearing $b$ at the left end of the carriage, a feed wheel D having an inwardly projecting cylindrical hub $d$ a clutch sleeve E secured to the head $e$ on the right end of the platen and turning with the outer part of its bore on the hub $d$ of the feed wheel, and a shifting rod $f$ arranged axially in the platen and feed wheel and journaled adjacent to the outer side of the feed wheel in a bearing F at the right end of the carriage. The feed wheel may be turned forward step by step for advancing the platen by any suitable means, the means for this purpose shown in Fig. 2 consisting of a ratchet lever G pivoted on the carriage and provided with a pawl $g$ which engages an annular row of ratchet teeth $g^1$ arranged on the periphery of the feed wheel. Backward movement of the latter is prevented by means of a detent pawl $h$ secured to the carriage and engaging with the teeth of the ratchet feed wheel.

The clutch mechanism shown in Figs. 1–7, for connecting and disconnecting the feed wheel and platen includes the shifting rod $f$ as one of its elements and is constructed as follows: I represents a guide tube or sleeve surrounding the inner part of the shifting rod *f* and connected at its outer end with the hub of the feed wheel so as to form practically an inward extension of the latter. J, J represent two curved clutch jaws or shoes arranged between the clutch sleeve and the guide sleeve and adapted to engage with their outer convex sides against the bore of this sleeve. At their opposing ends these clutch jaws are provided with beveled faces *j* and one or both of these jaws is preferably pivoted directly at one end on the hub of the feed wheel by a longitudinal pivoted pin or screw $j^1$, as shown in Figs. 3, 4 and 5, so as to compel these shoes and the parts coöperating therewith to turn positively with the feed wheel. K, K represent a pair of clutch levers which are arranged lengthwise within the hollow platen on opposite sides of its axis and each having its front arm constructed to form a wedge $k^1$ which tapers radially inward while its rear arm is provided with a lug $k^2$ which projects radially inward therefrom. The wedge of each clutch lever is arranged between two corresponding ends of the clutch jaws and when moved radially inward engages the beveled faces thereon, whereby the clutch jaws are spread and caused to bear frictionally against the bore of the clutch sleeve, thereby causing the platen and feed wheel to be coupled. Upon turning the clutch levers so that their wedge-shaped front arms are moved radially outward the clutch jaws are released from the bore of the clutch sleeve and the platen is free to turn independently of the feed wheel. The clutch levers are pivoted on opposite ends of a bracket, cross piece or head L which is secured to the guide sleeve adjacent to the inner side of the clutch jaws. M represents a shifting sleeve for operating the clutch levers and the platen. This sleeve is slidable lengthwise and also rotatable on the inner end of the guide sleeve and provided with an inwardly tapering conical face *m*, a cylindrical face $m^1$ at the base of the conical face, and a flatsided flank $m^2$ at the apex of the conical face. The inner end of the shifting rod *f* is connected by a screw joint, as shown or otherwise, with the shifting sleeve M and its outer end is provided with a button, knob, handle or finger piece N. The flat-sided shank of the shifting sleeve engages with a correspondingly shaped opening in a diaphragm *o* secured in the bore of the platen, whereby this shifting sleeve and the platen are compelled to turn together but the sleeve is capable of longitudinal movement independently of the platen.

In the position of the parts shown in Fig. 1, the shifting sleeve is moved to the right into its retracted or inoperative position, so that the apex of the cone on the shifting sleeve is in line with the lugs on the clutch levers, whereby the latter are free to turn in the direction for disengaging the clutch jaws from the clutch sleeve. While the parts are in this position the platen is disengaged from the feeding mechanism and may be turned independently thereof for bringing any desired parts of its periphery to the printing line or for other purposes. After the platen has been shifted as much as desired independently of the feeding mechanism the handle N is pushed inwardly together with the shifting rod and shifting sleeve a sufficient extent to cause the conical face of the shifting sleeve to move past the lugs of the clutch levers and then engage its cylindrical face with said lugs, whereby these levers are turned in the direction for causing its wedge-shaped front arms to spread the clutch jaws into engagement with the bore of the clutch sleeve and cause the platen to be coupled with the feed wheel. When the platen is thus connected with the feed wheel the same is again under the control of its feeding mechanism and cannot be moved or turned independently of this mechanism.

Provision is made for preventing the shifting sleeve from accidentally moving lengthwise in the platen and releasing the clutch levers when the carriage is jarred from any cause, particularly when tabulating, at which time the carriage often jumps a considerable space and is brought to a sudden stop. This is preferably effected by providing the cylindrical surface of the shifting sleeve adjacent to the base of its conical face with an annular groove $m^3$, as shown in Figs. 1 and 6. With this groove the lugs of the clutch levers are adapted to engage when the shifting sleeve is moved inwardly into its operative position, thereby holding the latter securely against accidental displacement in a direction lengthwise of its axis. This groove is preferably of such depth and is rounded as are also the inner ends of the lugs of the clutch levers, so that upon drawing the shifting sleeve outwardly its high cylindrical part can be readily disengaged from the clutch levers for uncoupling the platen from the feed mechanism. While engaging and disengaging the lugs of the clutch levers with the groove $m^3$ these levers are sprung somewhat this being possible by making these levers sufficiently resilient for this purpose.

The clutch for connecting and disconnecting the platen and its feeding mechanism and the turning movement of the platen independently of the feeding mechanism when disconnected from the latter may be effected by one hand applied to the handle, finger piece or knob N at the right end of the platen, inasmuch as this handle is operatively connected with the clutch and the platen and is therefore common to both. The other hand of the operator is thus left free to adjust the paper, make corrections, operate the machine or perform other functions. If desired, however the platen may be turned directly by means of a handle, finger piece or knob $N^1$ secured to the spindle at the left end of the platen.

Owing to the possibility of turning the platen from either end when the same is disengaged from the feeding mechanism and also enabling the coupling and uncoupling of the platen and feeding mechanism and the turning of the platen independently of the feeding mechanism to be effected by the same handle, the machine can be used with greater facility.

The modified construction of the clutch mechanism for typewriter platens, shown in Figs. 8 to 13, is constructed as follows: P, $P^1$ represents the right and left hand sections of a divided platen shaft which pass through heads $p$, $p^1$ at the right and left ends of the hollow platen and are journaled in bearings $q$, $q^1$ on the carriage. The right shaft section is provided with a handle, finger piece or knob $N^2$ and is connected with the platen so as to be compelled to turn therewith but be free to move lengthwise thereof, this connection being preferably effected by means of a transverse pin $r$ on this shaft section engaging with a longitudinal slot $r^1$ formed in the hub of the right platen head. The left hand shaft section is provided with a thumb piece, handle or knob $N^3$ and is connected with the feed mechanism of the platen which comprises a ratchet feed wheel $D^1$ secured to the shaft section $P^1$ between the bearing $p^1$ and the handle $N^3$, an actuating pawl $d^1$ engaging with the teeth of the feed wheel, and a detent pawl $d^2$ secured to the carriage and engaging with the teeth of the feed wheel. On the inner side of the left platen head the same is proivded with a clutch sleeve $E^1$ the bore of which is engaged by a pair of curved clutch shoes or jaws $J^1$, $J^1$. $K^1$, $K^1$ represent a pair of clutch levers pivoted on opposite sides of a cross piece or bracket $L^1$ secured to the left shaft section and having wedge shaped front arms $K^1$ engaging between the opposing beveled ends of the clutch jaws. $M^1$ represents a shifting sleeve which is secured at one end to the right shaft section while its opposite ends slides upon the opposing inner end of the left shaft section and forms a guide whereby these shaft sections are held in alinement with each other. This shifting sleeve is provided at its left end with a conical face $m$ and at the right of this conical face with a cylindrical face $m^1$ having an annular groove $m^3$ which is adapted to engage with inwardly projecting lugs $k^2$ on the rear arms of the clutch levers. Upon withdrawing the right shaft section together with the shifting sleeve by means of the right handle $N$ the lugs of the clutch levers are arranged in line with the apex of the cone on the shifting sleeve, whereby the wedge-shaped front arms of the clutch levers are disengaged from the clutch jaws and the platen is uncoupled from the feed mechanism. While the parts are in this position the platen is free to be turned independently of the feed mechanism by means of the right handle $N^2$ and during this time the left handle $N^3$ is incapable of turning the platen. Upon again pushing the right handle $N^2$ inwardly together with the right shaft section and shifting sleeve the cone of the latter by engaging with the lugs $K^2$ turns the clutch levers in the direction for causing them to spread the clutch jaws into engagement with the bore of the clutch sleeve, thereby again coupling the platen and its feed mechanism.

The construction of the platen clutch mechanism, shown in Figs. 16–20, is constructed as follows: $P^2$, $P^3$ represent the right and left sections of the platen shaft which are journaled respectively in bearings $q^2$, $q^3$ on the carriage and provided with handles or buttons $N^4$, $N^5$. The left shaft section passes through a head S on the left end of the platen and is compelled to turn with the same but is free to move lengthwise independently thereof by means of a transverse pin $s$ secured to this shaft section and engaging with a longitudinal slot $s^1$ in the hub of the platen head S. The right shaft section passes through the feed wheel $D^2$ of the platen feeding mechanism and is held in alinement with the left hand section by means of a shifting sleeve $M^2$ secured at its left end to the left shaft section and mounted loosely at its opposite ends on the left shaft section. The hub of the feed wheel $D^2$ turns in the outer part of the bore of the clutch sleeve $E^2$ arranged at the right end of the platen. $K^2$, $K^2$ represent two clutch levers pivoted on opposite sides of a bracket or cross piece $L^2$ secured to the right shaft section and engaging with their wedge shaped front arms $K^1$ between the beveled ends of a pair of clutch jaws $J^2$, $J^2$ arranged within the bore of the clutch sleeve $E^2$ while their rear arms are provided with lugs $K^2$ which are adapted to be engaged by a conical face $m$, a cylindrical face $m^1$ and a groove $m^3$ on the shifting sleeve $M^2$. One of the clutch jaws is pivoted at one of its ends by a pin $j^2$ to the feed wheel so as to compel the clutch jaws and the parts associated therewith to turn with the feed wheel. Upon pushing the left button $N^5$ inwardly or toward the right, the shifting sleeve $M^2$ turns the clutch levers in the direction for causing them to spread the clutch jaws into engagement with the bore of the clutch sleeve $E^2$, thereby coupling the platen and its feed mechanism.

Upon moving the left button toward the left together with the left shaft section and shifting sleeve, so that they occupy the position shown in Fig. 14, the clutch levers are permitted to relax and free the clutch jaws from the clutch sleeve E², thereby releasing the platen from the feed mechanism and permitting the platen to be turned by the left handle independently of the feed mechanism. When the platen is coupled with the feed mechanism the same can be forcibly turned by the button at either end thereof and overcome the resistance of the feed mechanism as is usually done.

In all of the several constructions of my improved clutch mechanism for typewriter platens, the clutch may be coupled and uncoupled and the platen may be turned when released from the feed mechanism by operating the same handle, thereby avoiding unnecessary movement of the hand and loss of time of the operator. Furthermore, in each of the several constructions shown and described the parts remain in their shifted position when the clutch is coupled or uncoupled without requiring constant pressure of the hand of the operator to keep the parts in position, thereby enabling the operator to employ both hands when necessary for adjusting the paper, making corrections, or using them for other purposes.

By employing a pair of clutch levers which are arranged on opposite sides of the axis of the platen, shaft, and shifting sleeve the pressure of these levers is neutralized so far as any effect on the shaft is concerned, thereby preventing this shaft from being distorted or deflected laterally and cause binding of the parts which would occur if only one clutch lever were employed.

Although the foregoing description refers more particularly to the application of my invention in the platen of a typewriting machine it is obvious that the same is equally applicable to platens of adding machines in which the numbers are printed on a sheet and also to other machines in which characters are written on a platen by means of type and it is therefore to be understood that the term "typewriter" in the specification and claims is intended to comprehend these several kinds of machines.

I claim as my invention:

1. In a typewriter, the combination of a platen, a feed device for the platen, and a clutch for connecting and disconnecting the platen and feed device comprising a clutch jaw connected with the feed device, a clutch lever engaging with said jaw, a cone adapted to engage with the lever, and means for compelling the cone and platen to turn together but permitting the cone to move axially independently of the platen consisting of a flat sided shank arranged on the cone, and a diaphragm secured to the platen and having a flat-sided opening which receives said shank.

2. In a typewriter, the combination of a platen, a feed device for the platen, and a clutch for connecting and disconnecting the platen and feed device comprising a clutch jaw connected with the feed device, a clutch lever engaging with said jaw, and a shifting sleeve having a conical face adapted to shift said lever into its operative position, a straight face which engages with said lever when the same is in its operative position and a groove in said straight face with which the lever interlocks in its operative position.

3. In a typewriter, the combination of a platen, a feed device for the platen, and a clutch for connecting and disconnecting the platen and feed device comprising a clutch jaw connected with the feed device, a clutch lever engaging with said jaw, a cone adapted to engage with the lever, means for compelling the cone and platen to turn together but permitting the cone to move axially independently of the platen, and a guide sleeve upon which said cone is mounted and which is connected with the feed device.

4. In a typewriter, the combination of a hollow platen, a feed device having a wheel provided with a hub, a clutch sleeve secured to the platen and turning with part of its bore on the hub of said wheel, a pair of clutch jaws arranged within the bore of said clutch sleeve and having their opposing ends beveled, a pair of clutch levers having wedge shaped outer arms which engage between the beveled ends of the clutch jaws while their opposite arms are provided with lugs which project radially inward, a shifting sleeve having conical and cylindrical faces adapted to engage with said lugs for turning said levers and also having a flat sided shank, a diaphragm secured to the platen and having a flat sided opening which receives said shank, a guide sleeve connected with said wheel and supporting said shifting sleeve, a cross piece which is secured to said guide sleeve and to which said levers are pivoted, and a shifting rod slidable lengthwise in the guide sleeve and feed wheel and connected with said shifting sleeve.

Witness my hand this 25th day of May, 1908.

GEORGE M. HOWE.

Witnesses:
 THEO. L. POPP,
 ANNA HEIGIS.